(12) United States Patent
Nakagawa et al.

(10) Patent No.: US 12,420,369 B2
(45) Date of Patent: Sep. 23, 2025

(54) PALLET SUPPLY APPARATUS

(71) Applicant: DMG MORI CO., LTD., Nara (JP)

(72) Inventors: Koji Nakagawa, Nara (JP); Daisuke Miyamoto, Nara (JP)

(73) Assignee: DMG MORI CO., LTD., Nara (JP)

( * ) Notice: Subject to any disclaimer, the term of this patent is extended or adjusted under 35 U.S.C. 154(b) by 280 days.

(21) Appl. No.: 17/926,299

(22) PCT Filed: May 20, 2020

(86) PCT No.: PCT/JP2020/019874
§ 371 (c)(1),
(2) Date: Nov. 18, 2022

(87) PCT Pub. No.: WO2021/234834
PCT Pub. Date: Nov. 25, 2021

(65) Prior Publication Data
US 2023/0211950 A1 Jul. 6, 2023

(51) Int. Cl.
*B23Q 7/14* (2006.01)
*B23Q 1/48* (2006.01)
(Continued)

(52) U.S. Cl.
CPC ......... *B23Q 7/1431* (2013.01); *B23Q 1/4866* (2013.01); *B23Q 11/08* (2013.01); *B23Q 11/0053* (2013.01); *B65G 2201/0267* (2013.01)

(58) Field of Classification Search
CPC .. B23Q 1/4866; B23Q 11/08; B23Q 11/0053; B23Q 7/1431; B23Q 7/1442; B23Q 7/1447; B23Q 7/1452; B65G 2201/0267
(Continued)

(56) References Cited

U.S. PATENT DOCUMENTS 3,648,819 A * 3/1972 Converse, III ........ G01M 15/02
  198/351
4,747,193 A * 5/1988 Hashidate ............ B23Q 7/1442
  29/33 P
(Continued)

FOREIGN PATENT DOCUMENTS

DE 8606773 U1 7/1987
JP S6179544 A 4/1986
(Continued)

OTHER PUBLICATIONS

International Search Report for related Application No. PCT/JP2020/019874; report dated Aug. 25, 2020.
(Continued)

*Primary Examiner* — Mark A Deuble
(74) *Attorney, Agent, or Firm* — von Briesen & Roper, s.c.

(57) ABSTRACT

The present invention includes a pallet storage device (30) having holding units (31, 32, 33) holding pallets (P) and a frame (40) supporting the holding units (31, 32, 33), a conveyance device (10) having a traveling base (11) having a traveling path (11*a*) extending along the pallet storage device (30) and a conveyance unit (15) loading and unloading the pallets (P) into and from the holding units (31, 32, 33) and conveying the pallets (P) to and from a predetermined place, and a controller (60) controlling operation of the conveyance device (10). The frame (40) has a space capable of receiving the controller (60) therein and has a plate-shaped cover (43, 48, 51) arranged to be located above the controller (60) and inclined downward toward the traveling base (11) side. The cover (43, 48, 51) is supported by the frame (40) such that a lower end of the cover (43, 48, 51) can be flipped up, and the cover (40) is configured such that the controller (60) can pass under the cover (43, 48, 51)

(Continued)

when the lower end of the cover (43, 48, 51) is in a flipped-up state.

14 Claims, 5 Drawing Sheets

(51) Int. Cl.
    *B23Q 11/00*     (2006.01)
    *B23Q 11/08*     (2006.01)

(58) Field of Classification Search
    USPC ..................................................... 198/346.1
    See application file for complete search history.

(56) References Cited

U.S. PATENT DOCUMENTS

| | | | | |
|---|---|---|---|---|
| 4,928,806 | A * | 5/1990 | Anderson | B23Q 16/04 |
| | | | | 198/345.1 |
| 5,018,617 | A * | 5/1991 | Miyata | B23Q 7/1431 |
| | | | | 198/465.1 |
| 5,346,051 | A * | 9/1994 | Keith | B23Q 7/1431 |
| | | | | 29/33 P |
| 5,353,495 | A * | 10/1994 | Terabayashi | B23P 21/00 |
| | | | | 198/346.2 |
| 8,397,896 | B2 * | 3/2013 | Kleinikkink | B23Q 7/1447 |
| | | | | 198/747 |
| 8,819,905 | B2 | 9/2014 | Nakano et al. | |
| 10,399,788 | B2 * | 9/2019 | Suzuki | B23Q 7/1447 |
| 2008/0067035 | A1 | 3/2008 | Keith et al. | |
| 2008/0271302 | A1 * | 11/2008 | Betzig | B23Q 39/024 |
| | | | | 901/50 |
| 2010/0044188 | A1 * | 2/2010 | Kim | B65G 1/04 |
| | | | | 198/602 |
| 2015/0142156 | A1 * | 5/2015 | Maseki | G05B 15/02 |
| | | | | 700/112 |
| 2021/0061577 | A1 * | 3/2021 | Okazaki | B23Q 7/1447 |
| 2022/0111475 | A1 * | 4/2022 | Cayley, Jr. | B23Q 7/1442 |

FOREIGN PATENT DOCUMENTS

| | | |
|---|---|---|
| JP | H0240728 U | 3/1990 |
| JP | H04106149 U | 9/1992 |
| JP | H06262495 A | 9/1994 |
| JP | H0885032 A | 4/1996 |
| JP | 2014083670 A | 5/2014 |
| JP | 2020019119 A | 2/2020 |

OTHER PUBLICATIONS

European Search Report related to Application No. 20936583.2; reported on Nov. 29, 2023.

* cited by examiner

PALLET SUPPLY APPARATUS

TECHNICAL FIELD

The present invention relates to a pallet supply apparatus that includes a pallet storage device storing pallets and conveys the pallets stored in the pallet storage device to a predetermined place.

BACKGROUND ART

A known example of the pallet supply apparatus as mentioned above is an apparatus (pallet conveyance apparatus) disclosed in Japanese Unexamined Patent Application Publication No. 2014-83670 (Patent Literature 1). The disclosed pallet conveyance apparatus transfers and conveys pallets between a pallet storage, a machining station, and a set-up station. This pallet conveyance apparatus includes the pallet storage that stores pallets, a carriage that is movable between the pallet storage, the machining station, and the set-up station, first and second pallet placing tables that are mounted on the carriage with a distance therebetween in the moving direction of the carriage, and a single pallet transferring means that is configured to transfer a pellet between the first pallet placing table and the machining station or the set-up station when positioned with respect to the first pallet placing table and transfer a pallet between the second pallet placing table and the machining station or the set-up station when positioned with respect to the second pallet placing table.

This pallet conveyance apparatus is configured to interchange the positions of the first and second pallet placing tables with respect to the machining station or the set-up station by moving the carriage in a state where the pallet transferring means is fixed. The carriage is configured to be moved in the forward and backward direction by a carriage driving means on a path that extends such that the carriage is movable between the pallet storage, the machining station, and the set-up station. The pallet transferring means is configured to be movable in the forward and backward direction relative to the carriage and to be fixed by a fixing means that locks and unlocks the pallet transferring means to and from the path.

According to this conventional pallet conveyance apparatus, the pallet conveyance apparatus capable of placing a pallet on each of the first and second pallet placing tables is enabled to exchange pallets with each of the machining station and set-up station by the single pallet transferring means. Therefore, the manufacturing cost for the pallet conveyance apparatus is reduced as compared with a pallet conveyance apparatus having a pallet transferring means for each of a pair of pallet placing parts.

Further, since the positions of the first and second pallet placing tables are interchanged in a state where the pallet transferring means is fixed at a position facing the machining station or the set-up station, it is not necessary to install the machining station and the set-up station in exact correspondence with the center-to-center pitch between the pallet placing parts, which facilitates installation of a pallet conveyance line in a plant or the like.

CITATION LIST

Patent Literature

Patent Literature 1: Japanese Unexamined Patent Application Publication No. 2014-83670

SUMMARY OF INVENTION

Technical Problem

In the above-described conventional pallet conveyance apparatus, the pallet storage is typically constituted by holding units holding pallets and a frame supporting the holding units in a row. Further, operations of the carriage driving means and pallet transferring means are controlled by a dedicated controller. In view of saving the space for the whole pallet conveyance apparatus, the pallet conveyance apparatus typically has a configuration in which the controller is received inside the frame of the pallet storage.

The installation of the thus-configured pallet conveyance apparatus in a plant is conventionally carried out in accordance with the following procedure. First, the structural components of the machining station, set-up station, and path are installed on their respective preset positions. Subsequently, the carriage is arranged on the path, and the controller is installed on its predetermined position and electrically connected to the carriage driving means and the pallet transferring means. Subsequently, the pallet storage is lifted by means of a hoisting device such as an overhead crane and installed on its predetermined position from above such that the controller is received in the pallet storage.

However, this installation procedure has the problem that the installation is very difficult in a plant which is not provided with a hoisting device such as an overhead crane. In such a case, it may be possible to use a crane vehicle or the like; however, using a crane vehicle is disadvantageous in that accurate fine positioning is difficult. In the first place, installing the pallet storage on a predetermined position from above by means of a hoisting device involves poor braking performance of the pallet storage, such as the pallet storage swinging when lifted. Therefore, in order to install the controller and the pallet storage while avoiding interference between them, the installation has to be carefully carried out, which brings about the problem that the installation of the pallet conveyance apparatus needs long time.

The present invention has been achieved in view of the above-described circumstances, and an object of the invention is to provide a pallet supply apparatus which can be installed in a short time without using a hoisting device such as an overhead crane.

Solution to Problem

To solve the above-described problems, the present invention provides a pallet supply apparatus including:
  a pallet storage device having: a plurality of holding units holding pallets; and a frame supporting the plurality of holding units in a row;
  a conveyance device having: a traveling base arranged parallel to the pallet storage device and having a traveling path extending along the pallet storage device; and a conveyance unit traveling on the traveling path to load and unload the pallets into and from the holding units and to convey the pallets to and from a predetermined place; and
  a controller controlling operation of the conveyance device,
  wherein:
  the frame has under the holding units a space capable of receiving the controller therein and has a cover of a plate shape arranged such that the cover is located above the controller with the controller received in the space and is inclined downward toward the traveling base side;

the cover is supported by the frame such that a lower end side of the cover can be flipped up; and the cover is configured such that the controller can pass under the cover when the lower end side of the cover is in a flipped-up state.

With this pallet supply apparatus, it is possible to install the components of the apparatus on their respective predetermined positions in the following manner. That is, first, the conveyance device is arranged on its predetermined position, and then the controller is temporarily placed near the conveyance device and the controller is connected to the conveyance device. Subsequently, with the lower end side of the cover in the flipped-up state, the frame is brought close to the conveyance device from the controller side such that the controller relatively passes under the cover, and arranged to be parallel to the conveyance device.

Subsequently, the controller is moved to and installed on a normal position set under the holding units in the frame. Thereafter, the cover is returned to its original downward inclined state from the flipped-up state. Thus, the pallet storage device, the conveyance device, and the controller can be installed on their respective set positions in the above-described manner.

As described above, with the pallet supply apparatus according to the present invention as well as the method of assembling the pallet supply apparatus, it is possible to, without using a hoisting device such as an overhead crane, fit together (install) the pallet storage device, the conveyance device, and the controller with the controller received in the space of the frame of the pallet storage device. Therefore, the pallet supply apparatus can be easily installed even in a plant which is not provided with a hoisting device such as an overhead crane.

Further, as compared with installation using a hoisting device, the braking performance of the controller in putting the controller into the space of the frame is better, which facilitates the avoidance of interference between the controller and the frame. Therefore, the installation of the frame and the controller is easily carried out in a short time.

In the present invention, a configuration is possible in which the cover is pivotally supported by the frame at its side opposite to the lower end side. This configuration facilitates the operation of flipping up the cover.

Further, in the present invention, a configuration is possible in which the frame has a locking tool to keep the lower end side of the cover in the flipped-up state. This configuration enables the lower end side of the cover to be kept in the flipped-up state by the locking tool, so that the installation of the frame and the controller can be efficiently carried out.

Further, in the present invention, a configuration is possible in which the frame and the controller each have a caster provided on a bottom thereof so that the frame and the controller can be transported by hand push. This configuration enables the frame and the controller to be easily moved, so that the installation of the frame and the controller can be efficiently carried out.

Further, in the present invention, a configuration is possible in which the frame and the controller each further have a stand with a height adjustment function provided on the bottom thereof. This configuration enables the frame and the controller to be easily adjusted in height position by adjustment of the height adjustment function of their respective stands.

Advantageous Effects of Invention

As described above, with the present invention, it is possible to, without using a hoisting device such as an overhead crane, fit together the pallet storage device, the conveyance device, and the controller with the controller received in the space of the frame of the pallet storage device. Therefore, the pallet supply apparatus according to the present invention can be easily installed even in a plant which is not provided with a hoisting device such as an overhead crane.

Further, as compared with installation using a hoisting device, the braking performance of the controller in putting the controller into the space of the frame is better, which facilitates the avoidance of interference between the controller and the frame. Therefore, the installation of the frame and the controller is easily carried out in a short time.

DESCRIPTION OF EMBODIMENTS

Figure 1:
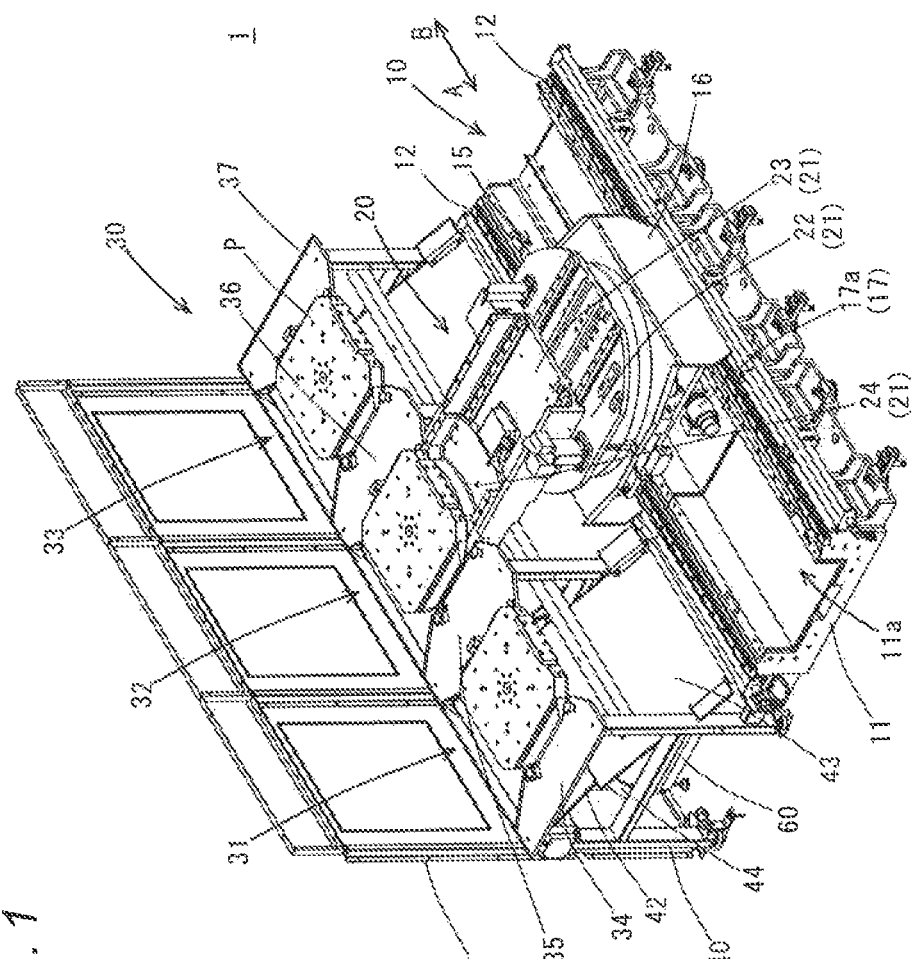
FIG. 1 is a front-side perspective view of a pallet supply apparatus according to an embodiment of the present invention.
Figure 2:
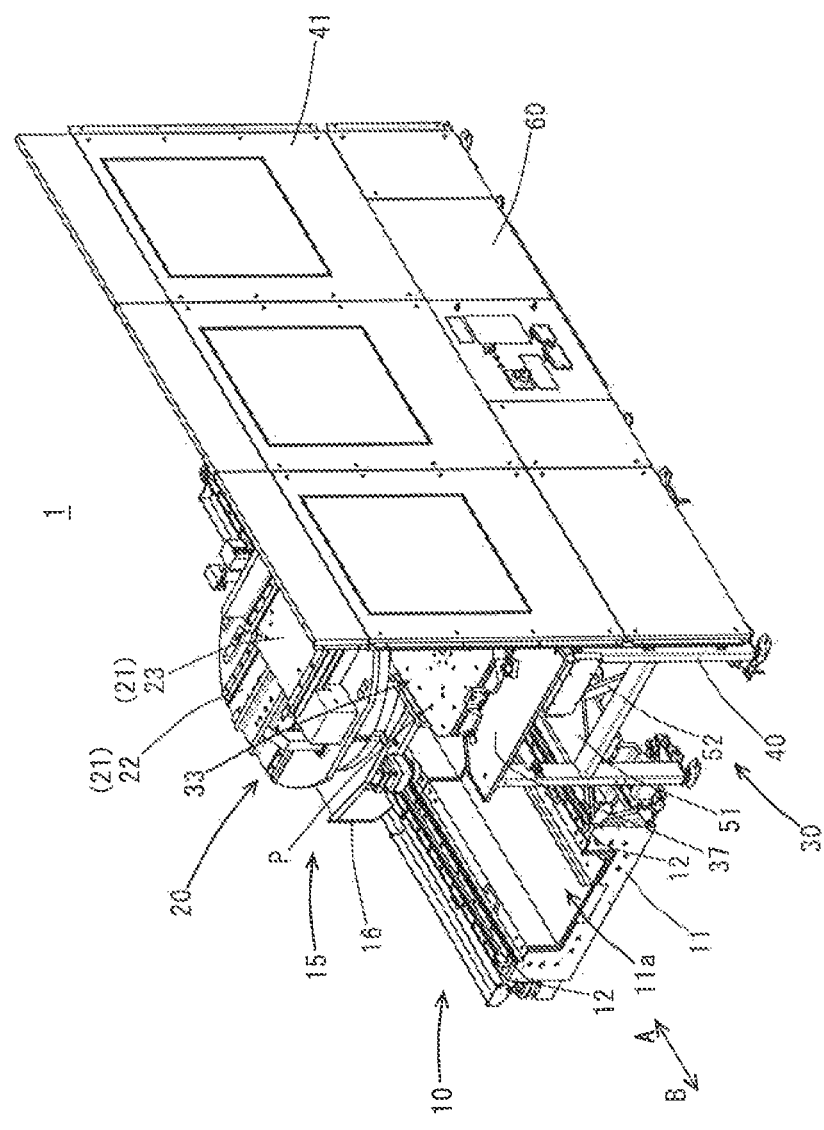
FIG. 2 is a rear-side perspective view of the pallet supply apparatus according to the embodiment.
Figure 3:
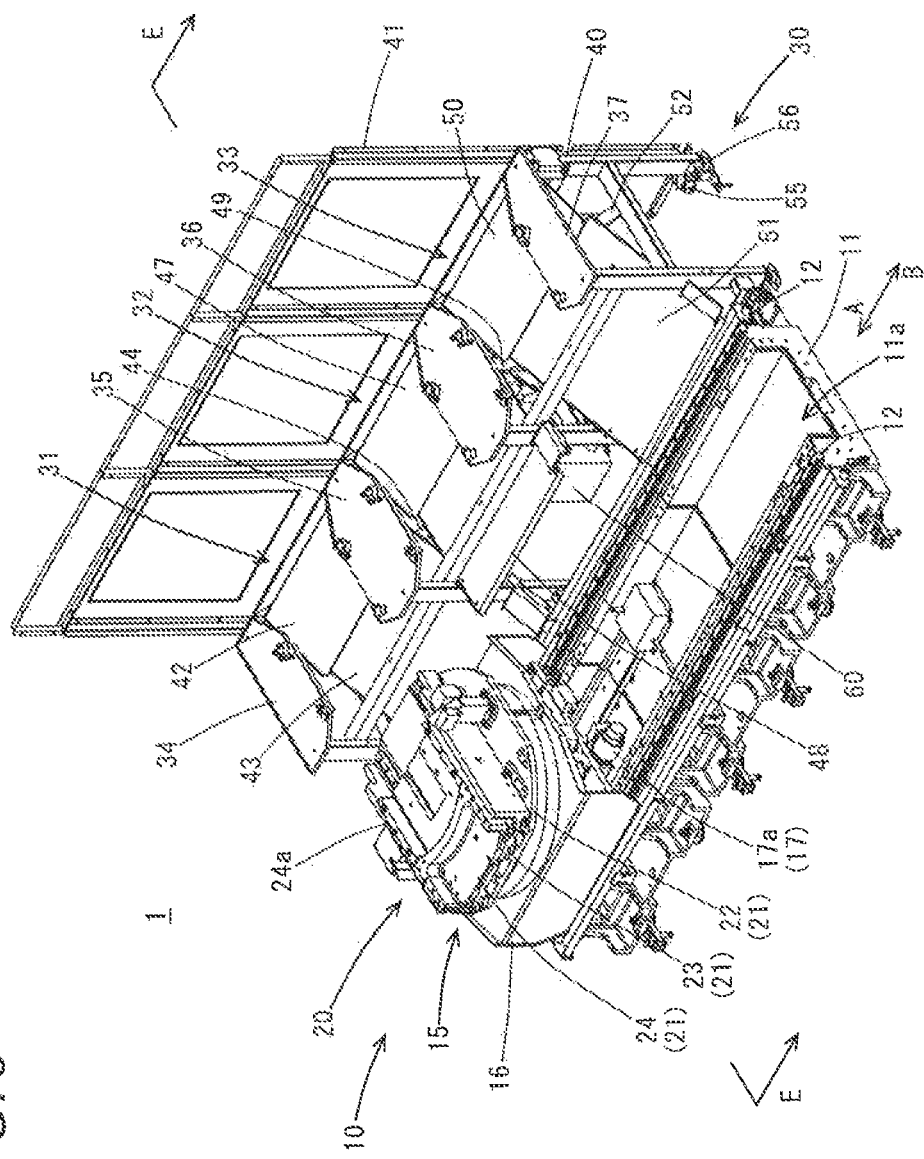
FIG. 3 is an illustrative diagram for illustrating a method of assembling the pallet supply apparatus according to the embodiment.
Figure 4:
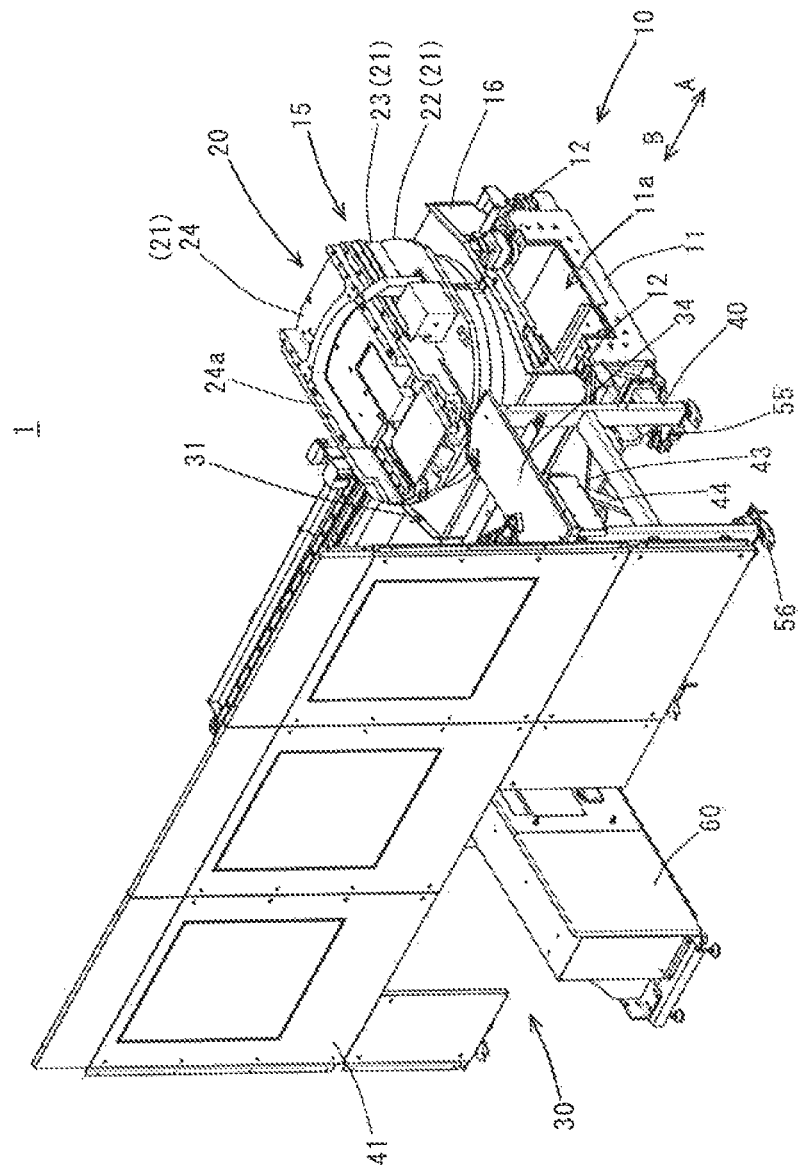
FIG. 4 is an illustrative diagram for illustrating the method of assembling the pallet supply apparatus according to the embodiment.

Hereinafter, a specific embodiment of the present invention will be described with reference to the drawings.

As illustrated in FIGS. 1 to 5, a pallet supply apparatus 1 according to this embodiment includes a conveyance device 10, a pallet storage device 30, and a controller 60.

The conveyance device 10 is constituted by a traveling base 11 having a traveling path 11a for conveying a pallet P to and from a predetermined place (supply point) and a conveyance unit 15 traveling on the traveling path 11a to load and unload the pallet P into and from the pallet storage device 30 and to convey the pallet P to and from the supply point. Note that the traveling base 11, which is partially illustrated in FIGS. 1 to 4, is arranged so as to connect the pallet storage device 30 and the supply point.

The traveling base 11 has a U-shaped cross section and has a guide rail 12 on each of its parallel top surfaces. The guide rails 12 form the traveling path 11a that extends along the direction of arrow A-B.

The conveyance unit 15 is constituted by a traveling carriage 16 placed on the pair of guide rails 12 via sliders, not illustrated, in a manner to lie across the pair of guide rails 12 and configured to be movable in the direction of arrow A-B, a moving mechanism 17 moving the traveling carriage 16 in the direction of arrow A-B, and a transferring mechanism 20 arranged on the traveling carriage 16.

The moving mechanism 17 may have any conventionally known structure capable of moving the traveling carriage 16 in the direction of arrow A-B. For example, the moving mechanism 17 may be constituted by a rack fixed on an inner wall surface of the traveling base 11 in a manner to extend along the longitudinal direction of the traveling base 11, a pinion gear provided on the traveling carriage 16 and meshing with the rack, and a drive motor 17*a* driving the pinion gear. In this moving mechanism 17, rotation of the pinion gear by the drive motor 17*a* causes the traveling carriage 16 to move in the direction of arrow A-B in accordance with the meshing between the pinion gear and the rack.

The transferring mechanism 20 is constituted by an extension unit 21 constituted by a base member 22, a first slide member 23, and a second slide member 24, which are sequentially arranged in a stack, and configured to be extendable toward the pallet storage device 30, an extension drive unit (not illustrated) extending the extension unit 21, a support unit 24*a* provided on the second slide member 24 so as to support a pallet P, and a lifting drive unit (not illustrated) lifting and lowering the support unit 24*a*.

The controller 60 controls operations of the moving mechanism 17 and transferring mechanism 20. The controller 60 is disposed inside the frame 40 of the pallet storage device 30, which is descried in detail later.

The pallet storage device 30 is constituted by holding plates 34, 35, 36, 37 aligned along the traveling base 11, plate-shaped inclined covers 42, 47, 50 respectively arranged on the rear side, i.e., the side far from the traveling base 11, below and between the holding plates 34, 35, 36, 37, plate-shaped flip-up covers 43, 48, 51 respectively arranged on the front side, i.e., the side close to the traveling base 11, below and between the holding plates 34, 35, 36, 37, a frame 40 supporting the holding plates 34, 35, 36, 37, the inclined covers 42, 47, 50, and the flip-up covers 43, 48, 51, and an outer wall 41 provided on the rear side of the frame 40.

The holding plates 34, 35, 36, 37 function as holding units for holding pallets P. The holding plates 34 and 35 together form a holding unit 31, the holding plates 35 and 36 together form a holding unit 32, and the holding plates 36 and 37 together form a holding unit 33. In the holding unit 31, a pallet P is to be placed on the holding plates 34 and 35 so as to lie across them. In the holding unit 32, a pallet P is to be placed on the holding plates 35 and 36 so as to lie across them. In the holding unit 33, a pallet P is to be placed on the holding plates 36 and 37 so as to lie across them.

The traveling carriage 16 is configured to be moved in the direction of arrow A-B and positioned at positions corresponding to the holding units 31, 32, and 33 by the moving mechanism 17. At each of the positions corresponding to the holding units 31, 32, and 33, the transferring mechanism 20 loads a pallet P into the corresponding holding unit 31, 32, 33 or unloads a pallet P held by the corresponding holding unit 31, 32, 33 onto the traveling carriage 16.

For example, when the traveling carriage 16 is positioned with respect to the holding unit 32 as illustrated in FIG. 1, the transferring mechanism 20 extends the first slide member 23 and the second slide member 24 with the support unit 24*a* supporting a pallet P and having been lifted by the lifting drive unit (not illustrated), whereby the pallet P is moved to a position above the holding plates 35 and 36 (the holding unit 32). Subsequently, the transferring mechanism 20 causes the lifting drive unit (not illustrated) to lower the support unit 24*a*, whereby the pallet P is placed onto the holding plates 35 and 36 (the holding unit 32). Thereafter, the transferring mechanism 20 contracts the first slide member 23 and the second slide member 24. In this manner, the pallet P is loaded into the holding unit 32.

On the other hand, in unloading a pallet P held by the holding unit 32 from the holding unit 32, the transferring mechanism 20 extends the first slide member 23 and the second slide member 24 with the support unit 24*a* supporting no pallet P and having been lowered by the lifting drive unit (not illustrated), whereby the support unit 24*a* is moved to a position under the pallet P placed on the holding plates 35 and 36 (the holding unit 32). Subsequently, the transferring mechanism 20 causes the lifting drive unit (not illustrated) to lift the support unit 24*a*, whereby the pallet P is supported by the support unit 24*a* and raised from the holding plates 35 and 36 (the holding unit 32). Subsequently, the transferring mechanism 20 contracts the first slide member 23 and the second slide member 24, so that the pallet P is unloaded onto the traveling carriage 16.

The inclined covers 42, 47, 50 and the flip-up covers 43, 48, 51 are arranged to be inclined downward toward an oil collection passage 11*b* formed on the traveling base 11. An upper-end upper surface of the flip-up cover 43 is connected to a lower-end lower surface of the inclined cover 42, an upper-end upper surface of the flip-up cover 48 is connected to a lower-end lower surface of the inclined cover 47, and an upper-end upper surface of the flip-up cover 51 is connected to a lower-end lower surface of the inclined cover 50. The lower ends of the flip-up covers 43, 48, 51 are positioned above the oil collection passage 11*b* of the traveling base 11. The inclined covers 42, 47, 50 and the flip-up covers 43, 48, 51 function as oil collection plates that lead oil and the like (including chips and the like) falling from pallets P placed on the holding units 31, 32, 33 to the oil collection passage 11*b*.

Further, the flip-up cover 43 is mounted at both sides to the frame 40 via a pair of support stays 44 pivotally supported by the frame 40. The flip-up cover 48 is mounted at both sides to the frame 40 via a pair of support stays 49 pivotally supported by the frame 40. The flip-up cover 51 is mounted at both sides to the frame 40 via a pair of support stays 52 pivotally supported by the frame 40.

Figure 5:
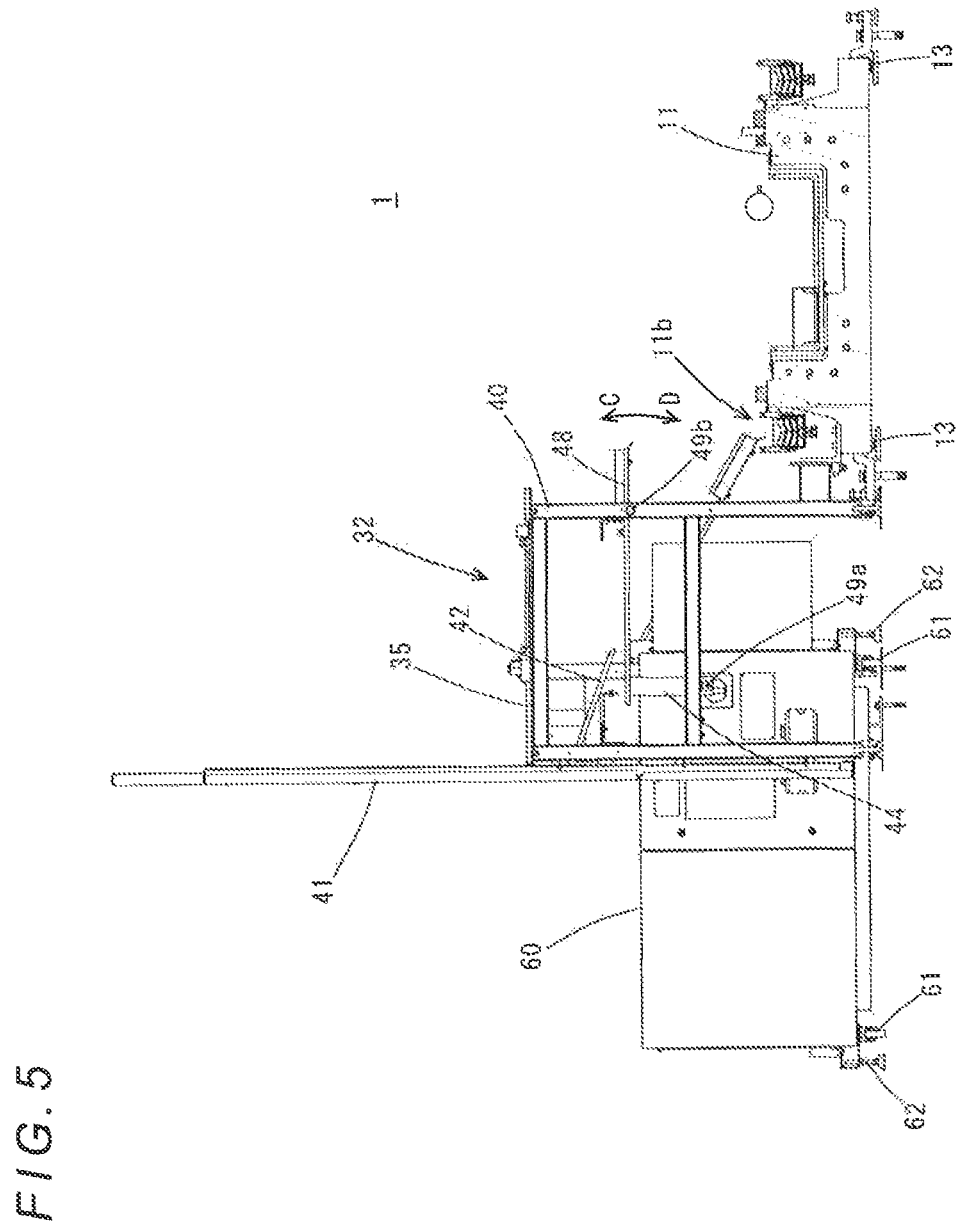
FIG. 5 is an illustrative sectional view taken along line E-E in FIG. 3 for illustrating the method of assembling the pallet supply apparatus according to the embodiment.

Thus, the flip-up covers 43, 48, 51 are each configured such that the lower end side thereof can be turned vertically with the pivots of the stays 44, 49, 52 as the fulcrum. For example, as illustrated in FIG. 5, the flip-up cover 48 is configured such that the lower end side thereof can be turned vertically (in the direction of arrow C-D) with the pivots (49*a*) of the support stays 49 as the fulcrum.

Further, the flip-up covers 43, 48, 51 are each configured to be kept in a flipped-up state, in which the lower end side thereof is flipped up, by a locking tool that is to be engaged with the frame 40. The locking tool may be of any type. In this embodiment, as illustrated in FIG. 5, a locking bolt 49*b* is used that is to be screwed into a column of the frame 40. In FIG. 5, the locking bolt 49*b* is screwed through a column of the frame 40 with the flip-up cover 48 in the flipped-up state, so that a lower end portion of the flip-up cover 48 is supported by the locking bolt 49*b* and thereby the flip-up cover 48 is kept in the flipped-up state. By removing the locking bolt 49*b* from the frame 40, the flip-up cover 48 is allowed to turn downward.

In this embodiment, when the flip-up covers 43, 48, 51 are flipped up (in the C direction), the controller 60 can pass under the flip-up coves 43, 48, 51. Further, the controller 60 in this embodiment is installed on a position under the holding units 32 and 33.

The traveling base 11 is configured such that its horizontal level can be adjusted by means of jack bolts 13. The frame 40 has a plurality of casters 55 provided on the bottom thereof, and the castes 55 enable the frame 40 to be transported by human hands. Further, a plurality of stands 56 provided on the bottom of the frame 40 enable the frame 40 to be installed on the floor with its height position adjusted (in this state, the casters 55 are floating above the floor).

Similarly, a plurality of casters 61 provided on the bottom of the controller 60 enable the controller 60 to be transported by human hands, and a plurality of stands 62 provided on the bottom of the controller 60 enable the controller 60 to be installed on the floor with its height position adjusted (in this state, the casters 61 are floating above the floor).

In the pallet supply apparatus 1 according to this embodiment having the above-described configuration, under control by the controller 60, the traveling carriage 16 is driven by the moving mechanism 17 so that the traveling carriage 16 travels in the direction of arrow A-B along the traveling path 11*a* formed on the traveling base 11 to supply an appropriate pallet P stored in the pallet storage device 30 to the supply point and store a pallet P collected from the supply point into the pallet storage device 30.

In installing the pallet supply apparatus 1 according to this embodiment, for example, in a plant, the pallet supply apparatus 1 is assembled and installed in the manner described below. Note that the frame 40 and the controller 60 are transportable by hand push by virtue of the casters 55, 61.

First, the conveyance device 10 constituted by the traveling base 11 and the conveyance unit 15 is arranged on a predetermined position. Subsequently, the controller 60 is transported by hand push and temporally placed near the traveling base 11, and then the controller 60 is electrically connected to the moving mechanism 17 and the transferring mechanism 20. Note that the installation of the traveling base 11 can be performed using a transporting machine such as a forklift or a handlift.

Subsequently, at least the flip-up cover 48 is flipped up and the locking bolt 49*b* is screwed with the frame 40 to keep the flip-up cover 48 in the flipped-up state. Thereafter, the frame 40 is moved close to the traveling base 11 from the controller 60 side such that the controller 60 relatively passes under the flip-up cover 48, and arranged to be parallel to the traveling base 11 (see FIGS. 3 to 5).

Subsequently, the controller 60 is adjusted in position by being turned, and moved to a normal position that is set under the holding units 32 and 33 of the frame 40. Thereafter, the locking bolt 49*b* is removed from the frame 40 so that the flip-up cover 48 returns to the original downward inclined state from the flipped-up state.

Subsequently, the stands 56, 62 are adjusted so that the frame 40 and the controller 60 are supported by the stands 56, 62 and adjusted in height position.

In this manner, the conveyance device 10, the pallet storage device 30, and the controller 60 are installed on their respective set positions.

As described above, with the pallet supply apparatus 1 according to this embodiment, it is possible to, without using a hoisting device such as an overhead crane, fit together the conveyance device 10, the pallet storage device 30, and the controller 60 with the controller 60 received in the space inside the frame 40 of the pallet storage device 30. Therefore, the pallet supply apparatus 1 can be easily installed even in a plant which is not provided with a hoisting device such as an overhead crane.

Further, as compared with installation using a hoisting device, the braking performance of the controller 60 in putting the controller 60 into the space inside the frame 40 is better, which facilitates the avoidance of interference between the controller 60 and the frame 40. Therefore, the installation of the frame 40 and the controller 60 can be easily carried out in a short time.

Further, since the pallet supply apparatus 1 according to this embodiment is configured such that the flip-up covers 43, 48, 51 can be flipped up (in the C direction) and kept in the flipped-up state, for example, maintenance of the space under the holding units 31, 32, 33 and maintenance of the controller 60 can be performed from the traveling base 11 side; therefore, the maintenances are facilitated. If the flip-up covers 43, 48, 51 cannot be flipped up, it is necessary to remove the outer wall 41 and the like mounted on the frame 40 to perform the maintenances, which complicates the maintenances.

Hereinbefore, an embodiment of the present invention has been described. However, the present invention is not limited to the above-described embodiment and can be implemented in other manners.

For example, three holding units 31, 32, 33 as pallet holding units are provided in the above-described embodiment. However, as a matter of course, the number of holding units provided is not limited to three and may be more than or less than three. Further, the holding units in the above-described embodiment are arranged on one side of the traveling base 11; however, the present invention is not limited to this configuration and a configuration is possible in which holding units are arranged on both sides of the traveling base 11.

As already mentioned above, the foregoing description of the embodiments is not limitative but illustrative in all aspects. One skilled in the art would be able to make variations and modifications as appropriate. The scope of the invention is not defined by the above-described embodiments, but is defined by the appended claims. Further, the scope of the invention encompasses all modifications made from the embodiments within a scope equivalent to the scope of the claims.

REFERENCE SIGNS LIST

1 Pallet supply apparatus
10 Conveyance device
11 Traveling base
11*a* Traveling path
15 Conveyance unit
16 Traveling carriage
17 Moving mechanism
20 Transferring mechanism
21 Extension unit
30 Pallet storage device
31, 32, 33 Holding unit
40 Frame
42, 47, 50 Inclined cover
43, 48, 51 Flip-up cover
44, 49, 52 Stay
60 Controller
61 Caster
62 Stand

The invention claimed is:

1. A pallet supply apparatus comprising:
a pallet storage device having: a plurality of holding units holding pallets; and a frame supporting the plurality of holding units in a row;
a conveyance device having: a traveling base arranged parallel to the pallet storage device and having a traveling path extending along the pallet storage device; and a conveyance unit traveling on the traveling path to load and unload the pallets into and from the holding units and to convey the pallets to and from a predetermined place; and a controller controlling operation of the conveyance device, wherein:

the frame has under the holding units a space capable of receiving the controller therein and has a cover of a plate shape arranged such that the cover is located above the controller with the controller received in the space and is inclined downward toward the traveling base side;

the cover is supported by the frame such that a lower end side of the cover can be flipped up; and the cover is configured such that the controller can pass under the cover when the lower end side of the cover is in a flipped-up state.

2. The pallet supply apparatus according to claim 1, wherein the cover is pivotally supported by the frame at its side opposite to the lower end side.

3. The pallet supply apparatus according to claim 2, wherein the frame has a locking tool to keep the lower end side of the cover in the flipped-up state.

4. The pallet supply apparatus according to claim 3, wherein the frame and the controller each have a caster provided on a bottom thereof so that the frame and the controller can be transported by hand push.

5. The pallet supply apparatus according to claim 4, wherein the frame and the controller each further have a stand with a height adjustment function provided on the bottom thereof.

6. The pallet supply apparatus according to claim 2, wherein the frame and the controller each have a caster provided on a bottom thereof so that the frame and the controller can be transported by hand push.

7. The pallet supply apparatus according to claim 6, wherein the frame and the controller each further have a stand with a height adjustment function provided on the bottom thereof.

8. The pallet supply apparatus according to claim 1, wherein the frame has a locking tool to keep the lower end side of the cover in the flipped-up state.

9. The pallet supply apparatus according to claim 8, wherein the frame and the controller each have a caster provided on a bottom thereof so that the frame and the controller can be transported by hand push.

10. The pallet supply apparatus according to claim 9, wherein the frame and the controller each further have a stand with a height adjustment function provided on the bottom thereof.

11. The pallet supply apparatus according to claim 1, wherein the frame and the controller each have a caster provided on a bottom thereof so that the frame and the controller can be transported by hand push.

12. The pallet supply apparatus according to claim 11, wherein the frame and the controller each further have a stand with a height adjustment function provided on the bottom thereof.

13. A method of assembling a pallet supply apparatus, the pallet supply apparatus including:

a pallet storage device having: a plurality of holding units holding pallets; and a frame supporting the plurality of holding units in a row;

a conveyance device loading and unloading the pallets into and from the holding units and conveying the pallets to and from a predetermined place; and a controller controlling operation of the conveyance device, wherein the frame has under the holding units a space capable of receiving the controller therein and has a cover of a plate shape arranged such that the cover is located above the controller with the controller received in the space and is inclined downward toward a traveling base side, the cover is supported by the frame such that a lower end side of the cover can be flipped up, and the cover is configured such that the controller can pass under the cover when the lower end side of the cover is in a flipped-up state, the method comprising:

first, arranging the conveyance device on a predetermined position, and then temporarily placing the controller near the conveyance device and connecting the controller to the conveyance device;

subsequently, with the lower end side of the cover in the flipped-up state, bringing the frame close to the conveyance device from the controller side such that the controller relatively passes under the cover and arranging the frame parallel to the conveyance device; and subsequently, moving the controller to a normal position set under the holding units of the frame and installing the controller on the normal position, and then returning the cover to its original downward inclined state from the flipped-up state.

14. A pallet supply apparatus comprising:

a pallet storage device having: a plurality of holding units holding pallets; and a frame supporting the plurality of holding units in a row;

a conveyance device having: a traveling base arranged parallel to the pallet storage device and having a traveling path extending along the pallet storage device; and a conveyance unit traveling on the traveling path to load and unload the pallets into and from the holding units and to convey the pallets to and from a predetermined place; and a controller controlling operation of the conveyance device, wherein:

the frame has under the holding units a space capable of receiving the controller therein and has a cover of a plate shape arranged such that the cover is located above the controller with the controller received in the space and is inclined downward toward the traveling base side;

the cover is supported by the frame such that a lower end side of the cover can be flipped up; and the frame is configured such that, when the lower end side of the cover is in a flipped-up state, the controller can be positioned under the cover and can be moved under the cover.

* * * * *